United States Patent [19]

Otavsky et al.

[11] 4,387,409

[45] Jun. 7, 1983

[54] MAGNETIC HEAD ARM MOUNTING APPARATUS

[75] Inventors: Pavel Otavsky, Woodstock, Vt.; Sigmund Hinlein, Sudbury, Mass.

[73] Assignee: Data General Corporation, Westboro, Mass.

[21] Appl. No.: 248,764

[22] Filed: Mar. 30, 1981

[51] Int. Cl.³ .......................... G11B 5/48; G11B 21/16
[52] U.S. Cl. .................................................... 360/104
[58] Field of Search ...................... 360/103, 102, 106

[56] References Cited

U.S. PATENT DOCUMENTS 4,107,748  8/1978  Ho ...................................... 360/104

FOREIGN PATENT DOCUMENTS 2846599  4/1980  Fed. Rep. of Germany ...... 360/106
55-70971  5/1980  Japan .................................. 360/106
732988   5/1980  U.S.S.R. ............................. 360/104

Primary Examiner—John H. Wolff
Attorney, Agent, or Firm—Robert L. Dulaney

[57] ABSTRACT

An apparatus for mounting of magnetic head arms on a head carriage in a disc drive memory system. The magnetic head arms are held firmly in place by clamping slug and bolt assemblies which are mounted through the head arm channel walls. The apparatus includes elements mounted in the head arm channel of the carriage for aligning and supporting the magnetic head arms in the channel.

12 Claims, 7 Drawing Figures

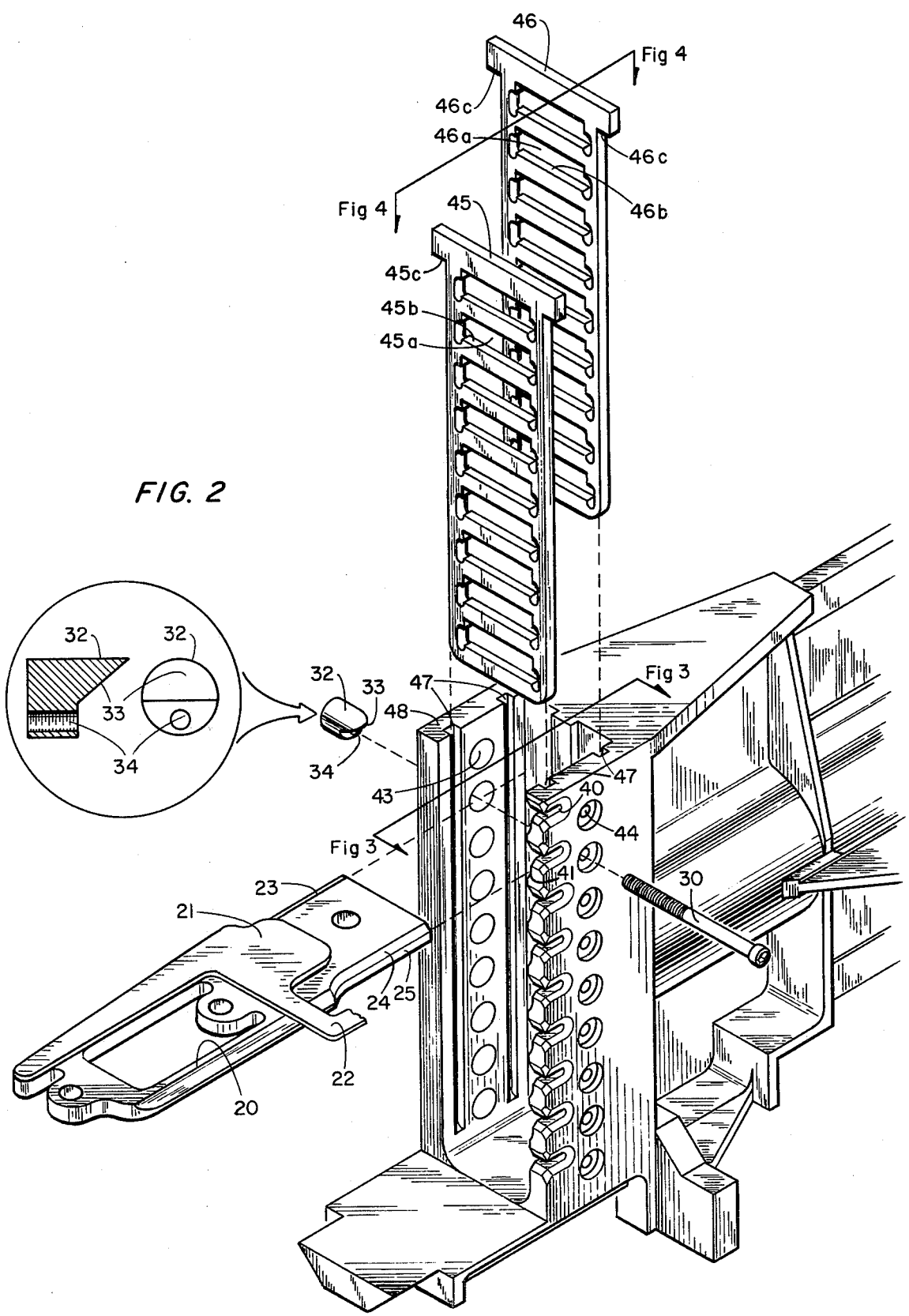

MAGNETIC HEAD ARM MOUNTING APPARATUS

BACKGROUND OF THE INVENTION

1. Field of the Invention

The present invention relates generally to memory apparatus for use in a data processing system and particularly to the mounting of magnetic head arms in a rigid magnetic disc memory apparatus.

2. Description of the Prior Art

Magnetic disc drive memory apparatus usually have one or more rigid rotatable discs coated with a material which permits storage of data on and retrieval of data from the disc surface. To accomplish the read and write operations a recording head is positioned adjacent to the surface of each disc. During operation of the memory apparatus, the heads are moved parallel to the surfaces of the discs to position the read/write gaps of the heads adjacent to the appropriate location on the disc surface where a read or write transaction is to take place.

A common type of rigid magnetic disc unit is the "IBM 3350" style disc drive. This unit has a plurality of magnetic rigid discs co-mounted about a central, spinable shaft. Each disc has one or more magnetic heads associated with it. The heads are mounted on head arms, up to four heads per arm. The head arms are mounted in a channel of the magnetic head carriage such that the head arms move in unison across the surface of the discs as the carriage moves. A typical head arm for use in this type of unit is the "Model 335004" manufactured by Applied Magnetics.

In the prior art the carriage channel is difficult and costly to manufacture in that the prior art method of accommodating the head arms requires a substantial amount of machining to be performed on the channel. In addition, the prior art technique used for mounting the magnetic head arms in the channel requires slits to be made in one of the channel walls. The channel structure is weakened by the presence of the slits and unfavorable resonant frequencies can result, causing degraded head arm performance.

The present invention relates to a novel apparatus for mounting of magnetic head arms in a magnetic disc unit which is free of the above-mentioned disadvantages and problems.

BRIEF SUMMARY OF THE INVENTION

The present invention relates to apparatus for mounting magnetic head arms in a magnetic disc memory. In a preferred construction of the invention, the head carriage has a head arm mounting channel, the channel having structure mounted therein for aligning and supporting each magnetic head arm in its proper location. Each magnetic head arm is clamped rigidly in place in the channel by a slug acting in concert with structure for applying force to the slug.

It is a further feature of this invention that the magnetic head arms are aligned and supported by ladder elements slidably mounted in grooves in the channel walls.

It is a further feature of this invention that each slug is movably mounted through an aperture in a wall of the channel.

It is a further feature of this invention that the structure for applying force to each slug is a bolt which is mounted through an aperture in the channel wall opposite from the slug and which engages a threaded hole in the slug.

It is a further feature of this invention that the channel wall opposite from the slug has an arcuate groove therein at the point of magnetic head arm contact whereby the forces resulting from clamping of the head arm against the wall are properly distributed.

It is a further feature of this invention that the aperture through which the bolt is mounted is counterbored.

It is an advantage of this invention that the head arm mounting channel of the carriage requires substantially less machining during manufacture than does the prior art channel.

It is a further advantage of this invention that this apparatus for mounting the head arms does not cause channel deformation.

Other features and advantages of the present invention will be understood after referring to the detailed description of the preferred embodiment and to the appended drawings wherein:

BRIEF DESCRIPTION OF THE DRAWINGS

FIG. 2 is a perspective view of an illustrative embodiment of the present invention including a segment of the magnetic head carriage showing head arm mounting elements in an exploded position;

DESCRIPTION OF THE PREFERRED EMBODIMENT

Figure 1:
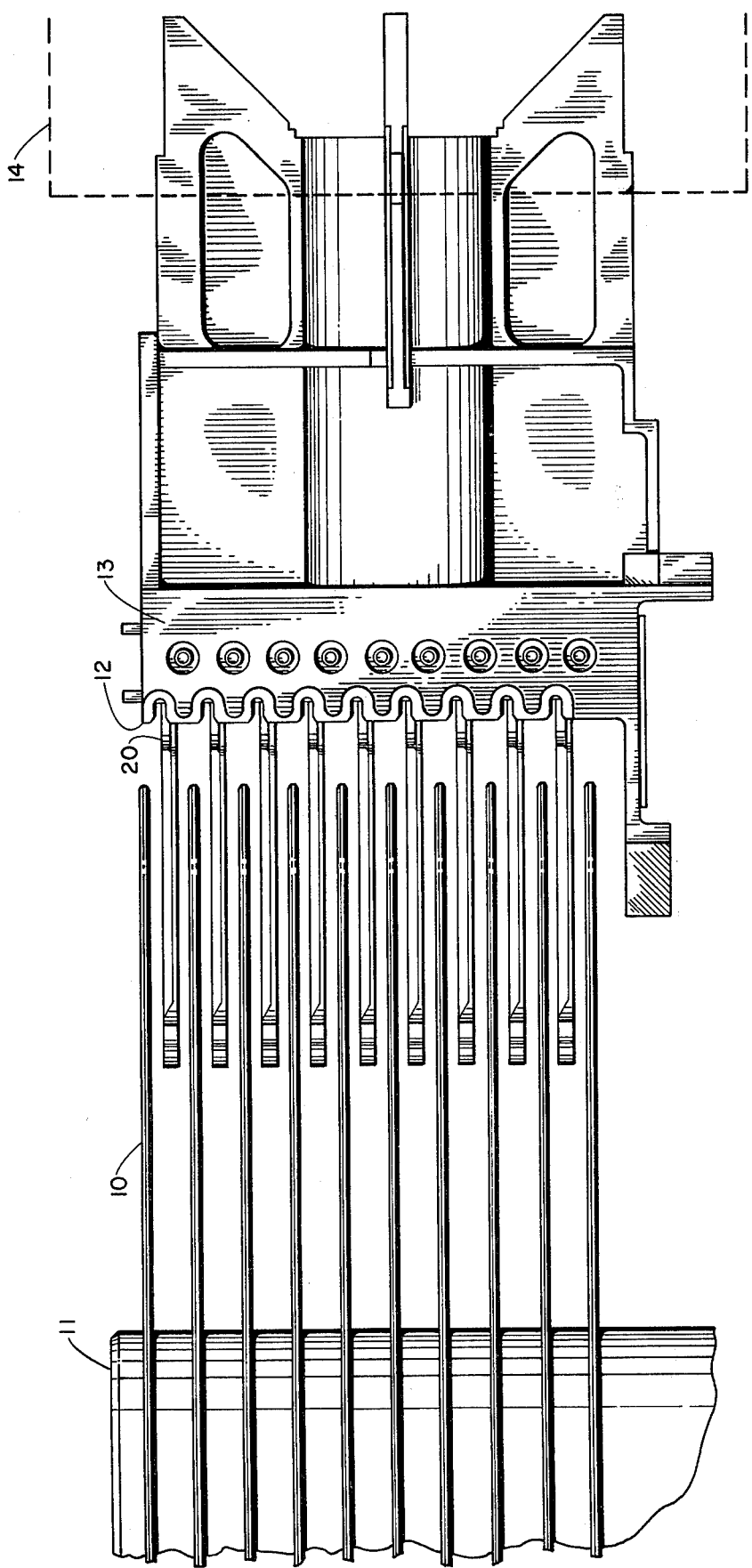
FIG. 1 is a side view of several major elements of a magnetic disc unit.
Figure 5:
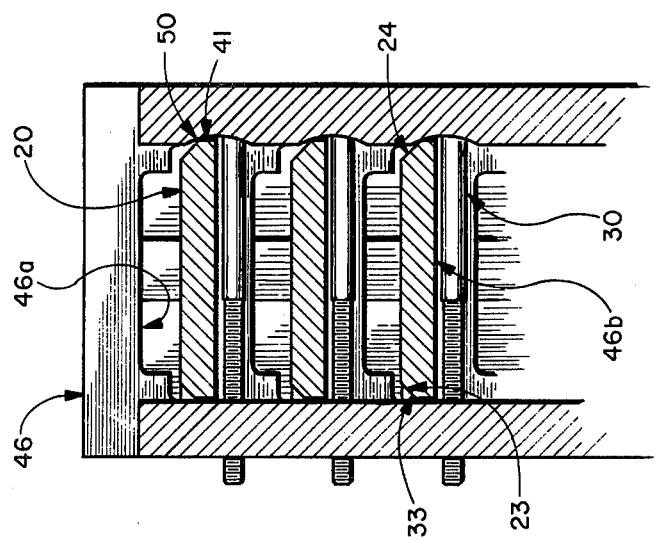
FIG. 5 is a cross sectional view of the head carriage showing details of the apparatus after head arm mounting.
Figure 4:
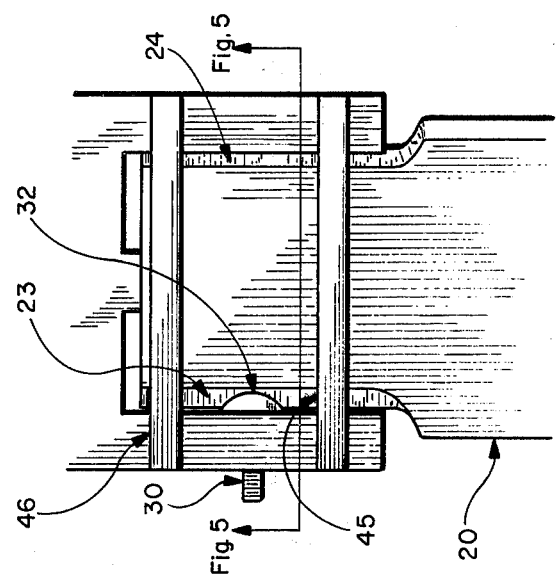
FIG. 4 is a top view of the magnetic head carriage of FIG. 2 showing details of the apparatus after head arm mounting.
Figure 3:
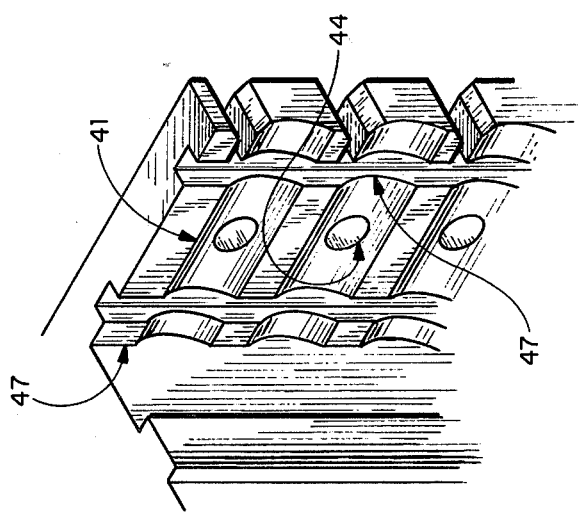
FIG. 3 is a perspective view of a segment of the magnetic head carriage of FIG. 2 viewed from a different position to facilitate display of certain features.

Referring to FIG. 1, a side view of a magnetic disc unit is presented. Magnetic discs 10 are mounted on shaft 11. Magnetic head arms 20 are mounted in channel 12 of movable carriage 13 and are positioned in relation to discs 10 by motor 14 as required to accomplish read/write operations at various locations on a disc surface. Circuitry and wiring (not shown) for performing the read/write operations is attached to and extends from magnetic head arms 20.

Referring now to FIG. 2, the mounting channel and head arm mounting elements are shown. Each head arm 20 has an associated clamping slug 32, aperture 43, bolt 30, aperture 44, aperture 45a and aperture 46a. These elements operate in conjunction with features of mounting channel 12 (described below) to accomplish mounting of head arms 20 to carriage 13.

Referring to FIGS. 2 through 5 in concert, a preferred embodiment of the invention is shown. It can be seen that a cross-section of the head arm mounting channel is substantially U-shaped, having a back wall and two substantially parallel side walls. Substantially identical ladder elements 45 and 46 are slidably mounted in channel grooves 47. Protruding sections 45c and 46c rest upon carriage surface 48 when ladder elements 45 and 46 are mounted in the channel and hold ladder elements 45 and 46 in the proper vertical postion. Ladder elements 45 and 46 have a like number of aligning apertures 45a and 46a therein. Each magnetic head arm 20 is mounted through an aperture 45a and 46a and is supported and aligned in the channel by surfaces 45b and 46b. Clamping slug 32 is mounted through aperture 43 such that slug 32 protrudes into the channel. Bolt 30 is mounted through aperture 44 in the channel wall and mates with threaded hole 34 in slug 32. As bolt 30 is turned, slug 32 is drawn toward magnetic head arm 20 causing surface 33 of slug 32 to be pressed against angled surface 23 of magnetic head arm 20, thereby urging magnetic head arm 20 into contact with surfaces 45b and 46b of ladder elements 45 and 46 and with arcuate groove 41. Groove 41 is located such that only edge 50 (i.e. junction of surfaces 24 and 25) of head arm 20 comes into contact with the channel wall as slug 32 applies clamping force to the head arm. At the point of contact between the head arm and the wall, the curvature of groove 41 is such that head arm 20 is urged downward against surfaces 45b and 46b of ladder elements 45 and 46. It can therefore be seen that in addition to the horizontal components of clamping force, both slug 32 and groove 41 create vertical force components which hold the head arm in contact with ladder elements 45 and 46. Head arm 20 is thereby firmly attached to carriage 13 and undesired head arm movement is substantially precluded. Groove 40 in the channel wall accommodates electrical wiring 22 of magnetic head arm 20 so as to prevent abrasion of wiring 22 during carriage movement, and aperture 44 is counter bored such that head of bolt 30 does not protrude beyond the outer surface of the channel wall after the head arm is mounted.

Figure 6:
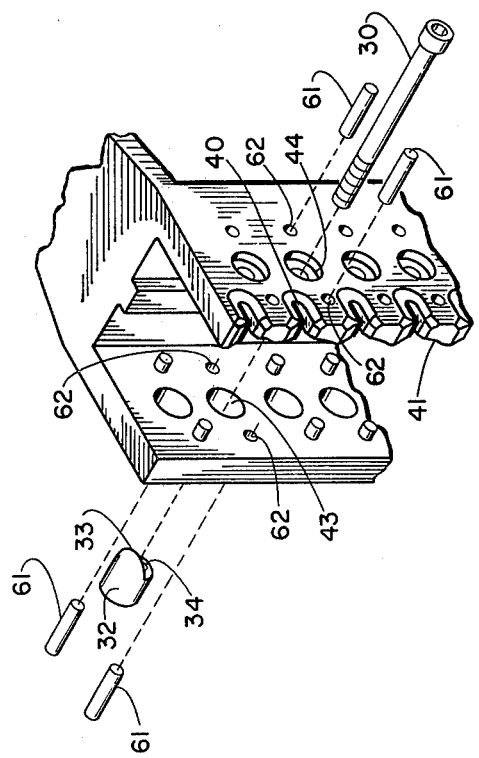
FIG. 6 shows an alternate embodiment of the present invention.

Referring to FIG. 6, a perspective view of a segment of the head carriage similar to the view in FIG. 2 is presented. This is one alternate embodiment of the mounting means. The supporting and aligning function of ladder elements 45 and 46 is performed by pins 61 which are press fitted through apertures 62 in both channel walls such that pins 61 protrude into the channel and magnetic head arm 20 rests thereon.

Figure 7:
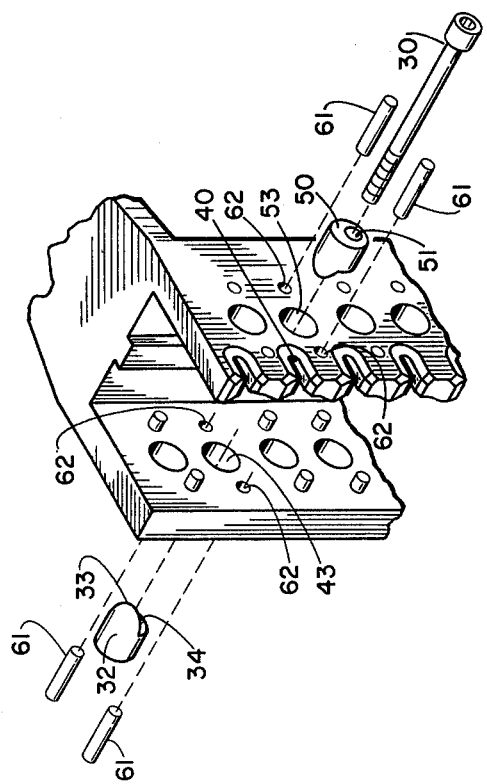
FIG. 7 shows another alternate embodiment of the present invention.

Referring to FIG. 7, another perspective view of a segment of the head carriage similar to the view in FIG. 2 is presented. This is another alternate embodiment of the mounting means. Countersunk aperture 44 has been replaced by aperture 53, which is of substantially the same size as aperture 43. In this figure, bolt 30 passes through aperture 51 in slug 50 which mounts through aperture 53. Bolt 30 then mates with aperture 34 in slug 32. Slug 50 differs from slug 32 only in that aperture 51 is smooth while aperture 34 is threaded. The need for grooves 41 in one channel wall has been eliminated because head arm 20 is clamped between the two slugs, rather than being pressed against the wall. As bolt 30 is turned, slug 32 is drawn toward slug 50, thereby forcing head arm 20 into contact with slugs 32 and 50 and with pins 31.

The present invention may be embodied in yet other specific forms without departing from the spirit or essential characteristic thereof. Two possible alternative embodiments have been shown, therefore, the present embodiments are to be considered in all respects as illustrations and not restrictive. All changes which come within the meaning and range of equivalency of the claims are intended to be embraced therein.

What is claimed is:

1. Magnetic disc memory apparatus for mounting a magnetic head arm to a head carriage having a magnetic head arm mounting channel having first and second substantially parallel walls, said apparatus comprising:
    means for aligning and supporting said magnetic head arm within said mounting channel,
    a clamping slug slidably mounted in said first wall, the slug having a surface that contacts said magnetic head arm formed at an angle such that said slug urges said magnetic head arm both horizontally against said second wall and vertically against said means for aligning and supporting, whereby said arm is properly aligned and mounted between said walls, and
    means for urging said clamping slug into contact with said magnetic head arm such that said magnetic head arm is clamped firmly against said second wall, said urging means being mounted in said second wall.

2. Apparatus as recited in claim 1 wherein said magnetic head arm aligning means is at least one ladder element, each said ladder element having at least one aperture therein such that said magnetic head arm is passed through said aperture and rests therein.

3. Apparatus as recited in claim 2, wherein each of said walls has at least one groove therein for receiving therein said at least one ladder element.

4. Apparatus as recited in claim 1, wherein each of said walls has at least one aligning aperture therein for receiving therein said magnetic head arm aligning means.

5. Apparatus as recited in claim 4 wherein said magnetic head arm aligning means is a pin mounted through each aligning aperture in each said wall in the head arm channel such that said pins are cantilevered into the head arm channel and said magnetic head arm rests on said pins.

6. Apparatus as recited in claim 1 wherein said second wall has an arcuate groove therein, such that said magnetic head arm is urged into contact with said arcuate groove when force is applied to said magnetic head arm by said clamping slug.

7. Apparatus as recited in claim 1 wherein said clamping slug has an aperture through it, such that said clamping slug can mate with said urging means.

8. Apparatus as recited in claim 7 wherein said urging means comprises:
    a bolt mounted through said clamping aperture in said second wall, and
    the slug aperture, said slug aperture being threaded such that said bolt can be screwably inserted therein.

9. Apparatus as recited in claim 8 wherein said aperture in said second wall is counterbored such that the head of said bolt does not protrude outside said second wall.

10. Apparatus for mounting a magnetic head arm to a head carriage, said head carriage having a head arm mounting channel having first and second substantially parallel walls, said apparatus comprising:
    means for aligning and supporting said magnetic head arm within said mounting channel;
    a first clamping slug slidably mounted in said first wall;
    a second clamping slug slidably mounted in said second wall;

wherein each of said slugs has a surface that contacts said magnetic head arm formed at an angle such that each said slug urges said magnetic head arm both horizontally against the other said slug and vertically against said means for aligning and supporting, whereby said arm to properly aligned and mounted between said walls, and means for urging said first slug toward said second slug and into contact with said magnetic head arm, whereby said magnetic head arm is held firmly in place by said first slug, said second slug and said aligning and supporting means.

11. Apparatus as recited in claim 10, wherein each said slug has an aperture through it such that said slugs can mate with said urging means.

12. Apparatus as recited in claim 11, wherein said urging means comprises:
- a bolt mounted through said aperture in said first slug and through said aperture in said second slug; and
- the aperture of said first slug, said first slug being disposed on said bolt such that said second slug is closer to the head of said bolt than said first slug, said aperture of said first slug being threaded so as to screwably mate with said bolt.

* * * * *